United States Patent
Doshi et al.

(10) Patent No.: US 11,799,988 B2
(45) Date of Patent: Oct. 24, 2023

(54) USER DATAGRAM PROTOCOL SEGMENTATION OFFLOAD FOR VIRTUAL MACHINES

(71) Applicant: VMware, Inc., Palo Alto, CA (US)

(72) Inventors: Ronak Doshi, San Jose, CA (US); Peng Li, Sunnyvale, CA (US); Guolin Yang, San Jose, CA (US); Boon Seong Ang, Saratoga, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/655,606

(22) Filed: Mar. 21, 2022

(65) Prior Publication Data

US 2023/0300224 A1  Sep. 21, 2023

(51) Int. Cl.
| | | |
|---|---|---|
| *H04L 12/951* | (2013.01) | |
| *H04L 29/06* | (2006.01) | |
| *H04L 69/16* | (2022.01) | |
| *H04L 69/325* | (2022.01) | |
| *H04L 69/22* | (2022.01) | |

(52) U.S. Cl.
CPC .............. *H04L 69/16* (2013.01); *H04L 69/22* (2013.01); *H04L 69/325* (2013.01)

(58) Field of Classification Search
None
See application file for complete search history.

(56) References Cited

U.S. PATENT DOCUMENTS

| | | | |
|---|---|---|---|
| 9,444,723 B1* | 9/2016 | Di Benedetto | H04L 69/325 |
| 9,641,435 B1* | 5/2017 | Sivaramakrishnan | |
| | | | H04L 69/166 |
| 11,546,238 B1* | 1/2023 | Xu | H04L 47/365 |
| 2010/0287304 A1* | 11/2010 | Chanda | H04L 69/32 |
| | | | 709/236 |
| 2011/0013637 A1 | 1/2011 | Xue et al. | |
| 2014/0160928 A1 | 6/2014 | Racz et al. | |
| 2016/0057070 A1* | 2/2016 | Saxena | H04L 49/3072 |
| | | | 370/392 |
| 2016/0119288 A1 | 4/2016 | Ardeli et al. | |
| 2017/0170986 A1 | 6/2017 | Kumar et al. | |
| 2017/0170987 A1 | 6/2017 | Kumar et al. | |
| 2019/0132296 A1* | 5/2019 | Jiang | H04L 63/029 |
| 2022/0006734 A1* | 1/2022 | Wang | H04L 41/0895 |
| 2022/0303231 A1* | 9/2022 | Yu | H04L 67/56 |

* cited by examiner

*Primary Examiner* — Duc T Duong
(74) *Attorney, Agent, or Firm* — Patterson + Sheridan LLP

(57) ABSTRACT

The disclosure provides an approach for segmenting a user datagram protocol (UDP) packets. A method includes generating the UDP packet, containing UDP data, at a virtual computing instance (VCI) running on a host machine; sending the UDP packet from the VCI to a hypervisor running on the host machine; after sending the UDP packet to the hypervisor, segmenting the UDP packet into a plurality of UDP segments, wherein each of the plurality of UDP segments includes a portion of the UDP data and a UDP header; and transmitting the plurality of UDP segments, over a network, to a destination of the UDP packet.

18 Claims, 9 Drawing Sheets

USER DATAGRAM PROTOCOL SEGMENTATION OFFLOAD FOR VIRTUAL MACHINES

BACKGROUND

Software defined networking (SDN) involves a plurality of hosts in communication over a physical network infrastructure of a data center (e.g., an on-premise data center or a cloud data center). The physical network to which the plurality of physical hosts are connected may be referred to as an underlay network. Each host has one or more virtualized endpoints such as virtual machines (VMs), containers, Docker containers, data compute nodes, isolated user space instances, namespace containers, or other virtual computing instances (VCIs). The VMs running on the hosts may communicate with each other using an overlay network established by hosts using a tunneling protocol.

Network virtualization makes it possible to programmatically create, provision, and manage networks all in software, using the underlying physical network as a simple packet-forwarding backplane. Network virtualization makes use of overlay technologies, which sit above the physical network hardware and work with the server hypervisor layer. Network and security services in software are distributed to hypervisors and "attached" to individual VMs in accordance with networking and security policies defined for each connected application.

As part of an SDN, any arbitrary set of VMs in a datacenter may be placed in communication across a logical Layer 2 network (e.g., an overlay network) by connecting them to a logical switch. A logical switch is collectively implemented by a virtual switch on each host that has a VM connected to the logical switch. Virtual switches provide packet forwarding and networking capabilities to VMs running on the host. The virtual switch on each host operates as a managed edge switch implemented in software by the hypervisor on each host.

A VM running on a host may include one or more applications running on top of a guest operating system (OS) of the VM. In certain cases, an application running on a source VM may transmit data to an application running on a destination endpoint, such as a destination VM, over a network using user datagram protocol (UDP). As is well understood, UDP is a communications protocol that can be used to establish low-latency and loss-tolerating connections between applications. In particular, the source VM may generate and send UDP packets, including UDP datagrams, to the destination VM. The UDP packets may include a UDP header and a payload including the data.

In some cases, a network may have a maximum transmission unit (MTU) that is the largest packet or frame size that can be sent in a packet-based or frame-based based network. For example, Ethernet protocol specifies a 1500-byte MTU. The MTU may apply to the packet header and the packet payload. In some cases, a UDP packet generated by the source VM may be larger than the MTU of the network over which the source VM is sending the packet. Accordingly, UDP fragmentation may be used to divide packets larger than the MTU of the network.

In UDP fragmentation, the entire UDP packet may be divided into multiple UDP fragments (e.g., each fragment having a size less than the MTU). Accordingly, only one of the UDP fragments may include the UDP header of the UDP packet. In particular, the UDP header is not inserted into each UDP fragment. As each UDP fragment does not include a UDP header, the application at the destination VM has to wait for all of the UDP fragments of a UDP packet to be received and then reassemble the UDP fragments into the UDP packet, before the destination VM can process the UDP packet to obtain the data in the payload of the UDP packet. Therefore, if even one UDP fragment is lost during transmission between the source VM and destination VM over the network, the entire UDP packet is considered as lost and would need to be retransmitted from the source VM to the destination VM. Thus, UDP fragmentation may lead to limited throughput.

Accordingly, techniques are needed for sending large UDP data in an SDN.

SUMMARY

The technology described herein provides a method of segmenting a user datagram protocol (UDP) packets. The method generally includes generating the UDP packet, containing UDP data, at a virtual computing instance (VCI) running on a host machine; sending the UDP packet from the VCI to a hypervisor running on the host machine; after sending the UDP packet to the hypervisor, segmenting the UDP packet into a plurality of UDP segments, wherein each of the plurality of UDP segments includes a portion of the UDP data and a UDP header; and transmitting the plurality of UDP segments, over a network, to a destination of the UDP packet.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
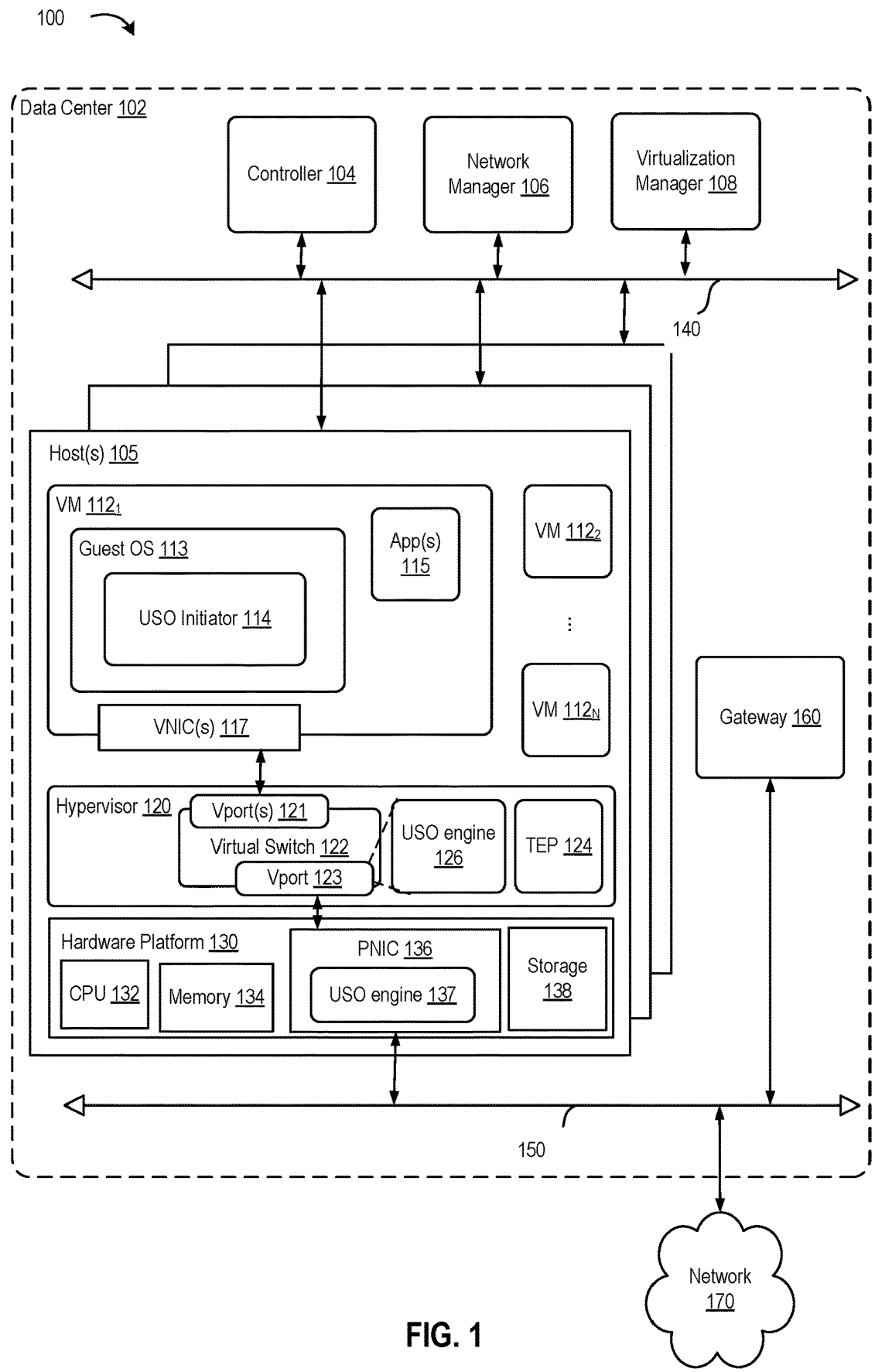
FIG. 1 depicts a block diagram of a data center that support UDP segmentation offload.

The present disclosure provides an approach for UDP segmentation offload (USO) in a virtual environment, such as an SDN. As used herein, UDP segmentation refers to dividing a UDP packet into smaller independent UDP packets (also referred to herein as UDP segments). As used herein, UDP segmentation is different than UDP fragmentation. For example, UDP fragments are not independent packets and require reassembly at the receiver, whereas as the UDP segments do not require reassembly. With fragmentation, the UDP header may be included only with the first fragment and not with the remaining fragments. UDP segments each have their own UDP header.

While reliability protocols may not be implemented in certain cases where USO is used, use of reliability protocols with USO may provide advantages over UDP fragmentation. A reliability protocol may allow a destination endpoint of packets, sent by a source endpoint, to request retransmission of any lost packets by the source endpoint. For example, sequence numbers may be assigned to a flow of packets, and the destination endpoint may request retransmission of any packets having a sequence number that is not received at the destination endpoint. With USO, because each UDP segment of a UDP packet is independent of the other UDP segments, if one UDP segment is lost (e.g., not successfully received at the destination endpoint), only the lost UDP segment, which may be identified by a segment number, may be retransmitted and not the other UDP segments that were received. In contrast, with UDP fragmentation, when one fragment is lost, all of the fragments are retransmitted. Accordingly, UDP segmentation saves CPU cycles and increases efficiency as well as increases throughput. Further, with USO, UDP segmentation can be offloaded to the hypervisor or a physical network interface (PNIC), further reducing the CPU workload.

As discussed in more detail herein, in some embodiments, a virtual network interface card (VNIC) for a source VM running an application that generates UDP data, is configured to support UDP segmentation offload. The source VM may generate the UDP data to send to a destination endpoint over a network. Certain aspects are discussed herein with a respect to a destination VM as the destination endpoint, but it should be noted that the techniques discussed herein may be applicable to other suitable virtual or physical endpoints.

Where the VNIC of the source VM is configured to support UDP segmentation offload, the application can send large UDP data to the guest OS of the source VM and the guest OS does not fragment or segment the large UDP data. Instead, the guest OS generates a UDP packet with the large UDP data and sends the UDP packet to the VNIC. As used herein, large UDP data may refer to a UDP datagram that is larger than an MTU size. The VNIC forwards the UDP packet to a virtual switch in a hypervisor of a source host machine running the source VM. In some embodiments, the application also provides (e.g., via a UDP socket) a maximum segment size (MSS) and a maximum number of segments (MNS) to the VNIC, the hypervisor, the uplink, and/or a PNIC.

In some embodiments, the virtual switch sends the packet to an uplink port (e.g., a virtual port (vport)) of the virtual switch. In some embodiments, the virtual switch first forwards the UDP packet to a tunnel end point (TEP) running on the hypervisor of the source host machine, where the UDP packet is encapsulated. For example, the UDP packet may be encapsulated with a tunnel header (e.g., with a Generic Network Virtualization Encapsulation (Geneve) header or VXLAN header). The TEP may then send the encapsulated UDP packet back to the virtual switch. The virtual switch then sends the encapsulated UDP packet to the uplink port.

In some embodiments, the uplink port determines whether a PNIC of the source host machine supports USO. If the uplink port determines the PNIC does not support USO, the uplink port segments the UDP packet. In some embodiments, the uplink port also calculates a checksum for each of the UDP segments and includes the checksums in the headers of the corresponding UDP segments. The uplink port then sends the UDP segments to the PNIC to send over the network to the destination endpoint. If the uplink port determines the PNIC does support USO, the uplink port sends the UDP packet to the PNIC. The PNIC then segments the UDP packets. In some embodiments, the PNIC also calculates the checksum for each of the UDP segments and includes the checksums in the headers of the corresponding UDP segments. The PNIC then sends the UDP segments over the network to the destination endpoint.

In some embodiments, a receiver of the UDP packet (e.g., a PNIC or port at a destination host running the destination VM) aggregates the UDP segments into a single UDP datagram before forwarding to the destination VM. In some embodiments, one or more of the UDP segments are lost. In some embodiments, the application running on the destination VM sends a negative acknowledgment (NACK) back to the application running on the source VM for the one or more lost UDP segments. The application running on the source VM may generate and resends the lost UDP segments (e.g., and not the other UDP segments of the UDP packet) to the destination VM.

In some embodiments, the full copy of the large UDP data is not passed between the application, guest OS, VNIC, hypervisor, and PNIC. Instead, only the memory address(es) where the large UDP data is stored may be passed as references in the metadata of the packet. When the PNIC sends the UDP segments to the receiver, the PNIC may access the memory addresses where the UDP data is stored to read the data and send to the destination VM.

Although parts of the disclosure are described with reference to VMs, the teachings herein also apply to other types of VCIs, such as containers, Docker containers, data compute nodes, isolated user space instances, namespace containers, and the like.

Further, it should be noted description of traffic or packets being "sent", "passed", or "forwarded" from one component to another within a host should be interpreted as being accessed or controlled by different components as the packets may reside in the same memory space or buffer in memory, while a descriptor or pointer is passed from one software module to the next. For example, every input/output (I/O) action to the memory space may be done by writing or reading a file descriptor. Descriptors can be passed via a socket. The socket is a communication connection endpoint, where socket application programming interface (API) calls can be used to establish communication links between processes running on a host or across hosts to pass the descriptors.

FIG. 1 depicts example physical and virtual network components in a networking environment 100 in which embodiments of the present disclosure may be implemented. Networking environment 100 includes a set of networked computing entities, and may implement a logical overlay network. As shown, networking environment 100 includes a data center 102 and a network 170.

Data center 102 includes one or more hosts 105, a controller 104, a network manager 106, a virtualization manager 108, a management network 140, a data network 150, and a gateway 160. Data network 150 and management network 140 may be implemented as separate physical networks or as separate virtual local area networks (VLANs) on the same physical network.

Host(s) 105 may be communicatively connected to data network 150 and management network 140. Data network 150 and management network 140 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 105 in data center 102 may be geographically co-located servers on the same rack or on different racks in any arbitrary location in data center 102. Host(s) 105 are configured to provide a virtualization layer, also referred to as a hypervisor 120, that abstracts processor, memory, storage, and networking resources of a hardware platform 130 into multiple VMs $112_1 \ldots 112_N$ (collectively referred to herein as VMs 112).

Each VM 112 includes a guest OS 113 and one or more applications 115. Application(s) 115 run on top of guest OS 113. Guest OS 113 may be a standard, commodity operating system, such as Windows, Linux, or other OS. An application 115 may be any software program, such as a VDI, a word processing program, or other software program.

In some embodiments, application 115 generates large UDP data (e.g., larger than an MTU size). Application 115 may send the UDP data to guest OS 113. In some embodiments, application 115 creates a UDP socket and sends the UDP data to guest OS 113 via the UDP socket. In some embodiments, application 115 also sends UDP segmentation information, including MSS and MNS, to guest OS 113 via the UDP socket. The segmentation information may then be passed to VNIC 117, hypervisor 120, and/or PNIC 136 in packet metadata.

Host(s) 110 may be constructed on a server grade hardware platform 130, such as an x86 architecture platform. Hardware platform 130 may include components of a computing device such as one or more processors (CPUs) 132, system memory 134, one or more network interfaces (e.g., PNIC 136), storage 138, and other components (not shown). A CPU 132 is configured to execute instructions, for example, executable instructions that perform one or more operations described herein and that may be stored in memory 134 and in storage 138. PNIC 136 enable host 105 to communicate with other devices via a physical network, such as management network 140 and/or data network 150.

Each of VMs 112 running on host 105 may include one or more VNIC(s) 117 responsible for exchanging packets between a VM 112 and hypervisor 120. A VNIC 117 may be, in some cases, a software implementation of a PNIC. VNICs 117 can connect VM(s) 112 to virtual ports, such as Vport(s) 121, provided by a virtual switch 122. Virtual switch 122 also has one or more Vport(s) 123 connected to PNIC(s) 136, such as to allow VMs 112 to communicate with virtual or physical computing devices outside of host 105 via data network 150 and/or management network 140. In some embodiments, VNIC 117 is configured to support USO. Where VNIC 117 supports USO, VNIC 117 may receive a UDP packet with large UDP data from guest OS 113. VNIC 117 may be configured to send the UDP packet to hypervisor 120. For example, VNIC 117 may send the UDP packet to a vport 121 of virtual switch 122. In some embodiments, VNIC 117 adds a flag, in metadata associated with the UDP packet, that USO may be performed on the UDP packet.

Hypervisor 120 architecture may vary. Virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, hypervisor 120 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Hypervisor 120 includes one or more virtual switches 122, TEP 124, and USO engine 126. A virtual switch 122 serves as a software-based interface between PNIC 136 and other physical resources available on host 105 to provide network connectivity to host 105 and VMs 112 on the host 105. A virtual switch 122 may be configured with a virtual switch profile that may specify the MTU size.

TEP 124 may be associated with software components, or it may itself, provide Layer 2 tunneling services for encapsulating egress packets from VMs and decapsulating ingress packets to implement a logical overlay network to interconnect VMs running on different hosts as part of the same layer 2 logical overlay network, meaning as part of the same logical layer-2 network/broadcast domain in the logical overlay network. Tunneling services may be implemented using SDP tunneling protocols such as virtual extensible local area network (VXLAN) or Generic Network Virtualization Encapsulation (GENEVE).

In some embodiments, virtual switch 122 forwards the UDP packet to TEP 124 for encapsulation and then forwards the encapsulated UDP packet to the uplink, for example, Vport 123. In some embodiments, virtual switch 122 forwards the UDP packet directly to Vport 123.

In some embodiments, Vport 123 is configured to determine whether PNIC 136 supports USO. Vport 123 may include a USO engine 126. If USO engine 126 determines that PNIC 136 does not support USO, USO engine 126 segments the UDP packet and then sends the UDP segments to PNIC 136. In some embodiments, USO engine 126 also calculates the checksum and inserts the checksums in the headers for the corresponding UDP segments. If USO engine 126 determines that PNIC 136 supports USO, USO engine 126 sends the (unsegmented) UDP packet to PNIC 136. Where PNIC 136 supports USO, PNIC 136 includes USO engine 137. PNIC 136 receives the UDP packet from Vport 123 and USO engine 137 segments the UDP packet. In some embodiments, USO engine 137 also calculates the checksum and inserts the checksums in the headers for the corresponding UDP segments. PNIC 136 then forwards the UDP segments to the destination (e.g., to data network 150 towards a destination VM 112 via network 170).

Network 170 may be an external network. Network 170 may be a layer 3 (L3) physical network. Network 170 may be a public network, a wide area network (WAN) such as the Internet, a direct link, a local area network (LAN), another type of network, or a combination of these.

Gateway 160 provides routing services and connectivity for VMs 112 and other components in data center 102 to networks that are external to the data center 102, such as network 170. Gateway 160 may be implemented as a VM 112 on a host 105, and referred to as an Edge Services Gateway (ESG) VM. Packets sent by VMs 112 in data center 102 and destined for an external network are encapsulated and sent to gateway 160 using TEP 124. Gateway 160 may also provide other networking services, such as firewalls, network address translation (NAT), dynamic host configuration protocol (DHCP), and load balancing.

Data center 102 includes a management plane and a control plane. The management plane and control plane each may be implemented as single entities (e.g., applications running on a physical or virtual compute instance), or as distributed or clustered applications or components. In alternative embodiments, a combined manager/controller application, server cluster, or distributed application, may implement both management and control functions. In the embodiment shown, network manager 106 at least in part implements the management plane and controller 104 at least in part implements the control plane Controller 104 manages configuration of VMs 112 within data center 102. Controller 104 may be one of multiple controllers executing on various hosts in data center 102 that together implement the functions of the control plane in a distributed manner. Controller 104 may be a computer program that resides and executes in data center 102 or, alternatively, controller 104 may run as a virtual appliance (e.g., a VM) in one of hosts 105. Controller 104 collects and distributes information about the network from and to endpoints in the network. Controller 104 communicates with hosts 105 via management network 140, such as through control plane protocols. In some embodiments, controller 104 implements a central control plane (CCP).

Network manager 106 and virtualization manager 108 generally represent components of a management plane comprising one or more computing devices responsible for receiving logical network configuration inputs, such as from a user or network administrator, defining one or more endpoints (e.g., VCIs) and the connections between the endpoints, as well as rules governing communications between various endpoints.

In some embodiments, virtualization manager 108 is a computer program that executes in data center 102, or alternatively, virtualization manager 108 runs in one of VMs 112. Virtualization manager 108 is configured to carry out administrative tasks for data center 102, including managing hosts 105, managing VMs 112 running within each host 105, provisioning VMs 112, transferring VMs 112 from one host 105 to another host 105, transferring VMs 112 between data centers 102, transferring application instances between VMs 112 or between hosts 105, and load balancing among hosts 105 within data center 102.

In some embodiments, network manager 106 is a computer program that executes in data center 102, or alternatively, network manager 106 may run in one of VM 112. Network manager 106 communicates with host(s) 105 via management network 140. Network manager 106 may receive network configuration input from a user or an administrator and generates desired state data that specifies how a logical network should be implemented in the physical infrastructure of data center 102.

Figure 2A:
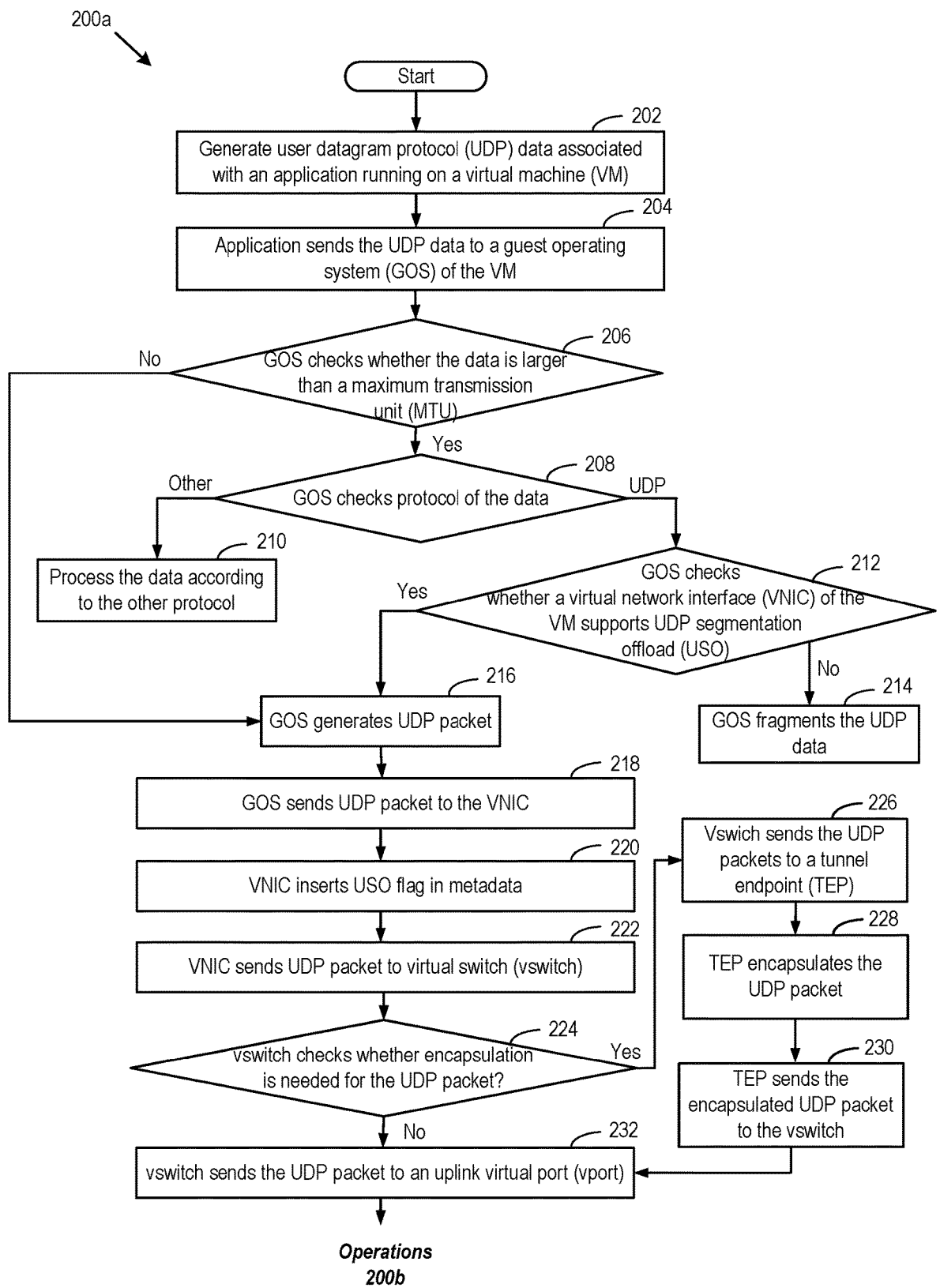
FIGS. 2A-B depict a workflow illustrating example UDP segmentation offload.
Figure 2B:
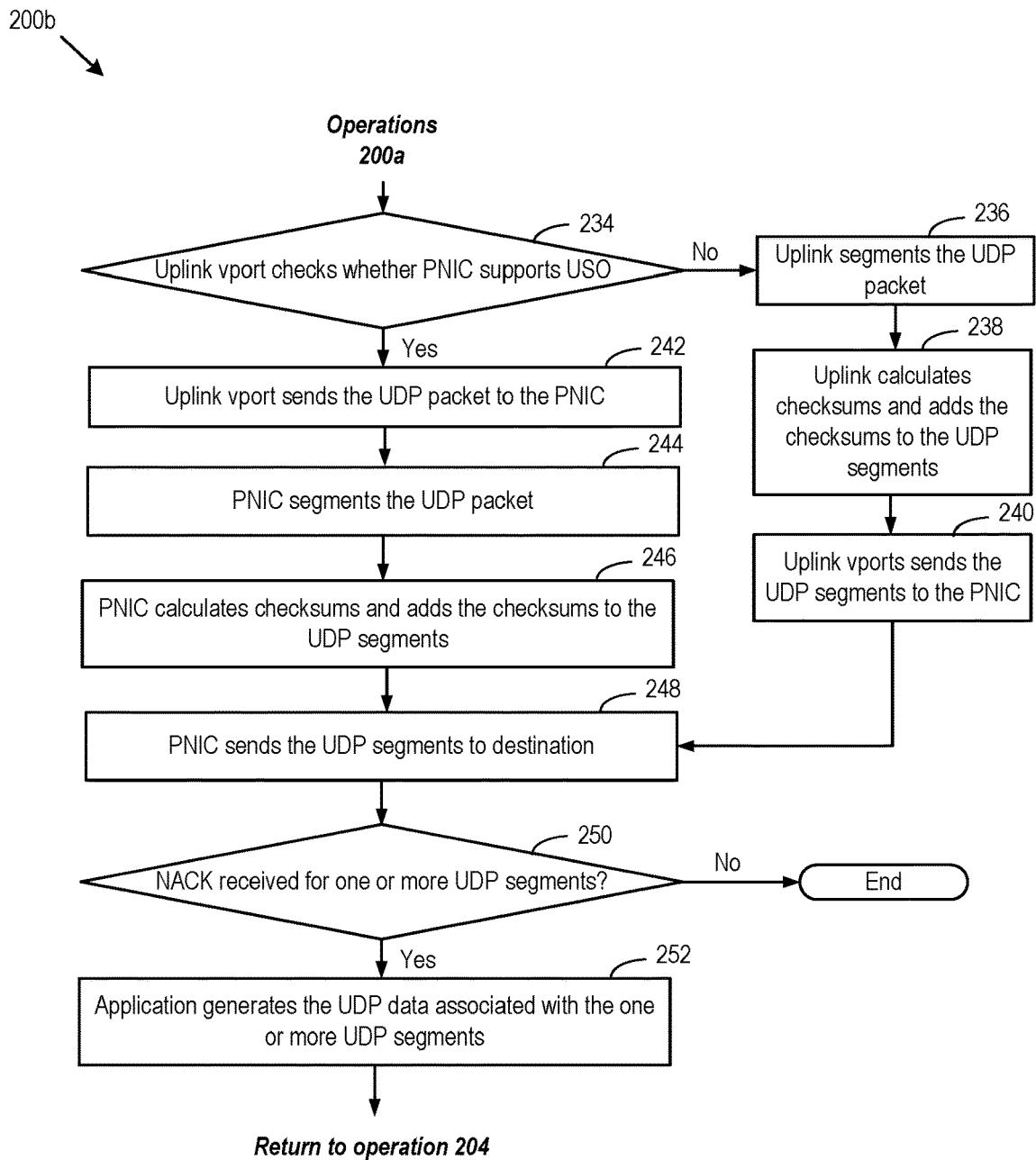

As discussed above, UDP segmentation offload may be supported to reduce latency, improve throughput, and increase efficiency for sending of large amounts of UDP data between components, such as VMs within data center 102 or across data centers 102 via network 170. FIGS. 2A-B depict a workflow illustrating example operations 200a-200b for UDP segmentation offload. FIGS. 2A-2B may be understood with respect to operations 300 illustrated in FIGS. 3A-D, which depict a call flow diagram illustrating example operations 300 for UDP segmentation offload, and with respect to the example UDP packet 400 illustrated in FIG. 4A.

It should be understood that the operations shown in FIGS. 2A-2B and FIGS. 3A-D may be performed in a different order than shown. Further, the operations in FIGS. 2A-2B and FIGS. 3A-D may include additional operations that are not shown and/or may omit one or more of the operations.

Figure 3A:
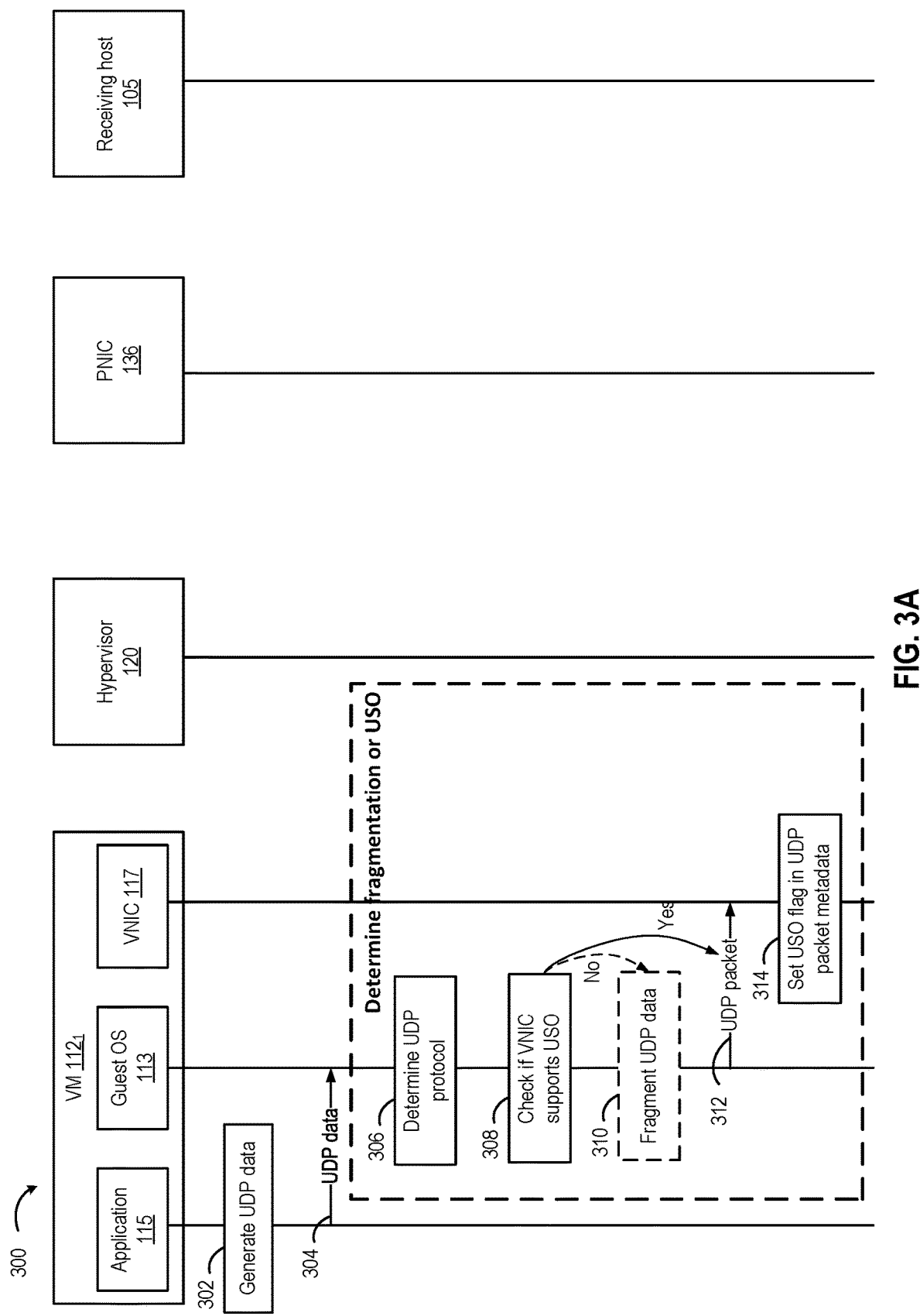
FIGS. 3A-D depict a call flow diagram illustrating example operations for UDP segmentation offload.

As shown in FIG. 2A, operations 200a may begin, at 202, by generating UDP data associated with an application running on a VM 1. As shown in FIG. 3A, at 302, application 115 running on VM $112_1$ generates UDP data.

At 204, an application sends the UDP data to a guest operating system (GOS) of the VM. As shown in FIG. 3A, at 304, application 115 sends the UDP data to GOS 113 of VM $112_1$.

At 206, the GOS checks whether the data is larger than an MTU. In some embodiments, USO initiator 114 of GOS 113 checks whether the data is larger than an MTU at 206.

At 208, where the GOS determines, at 206, the data is larger than the MTU, then GOS proceeds to check a protocol of the data at 208. In some embodiments, USO initiator 114 of GOS 113 checks the protocol of the data at 208.

At 210, where the GOS determines, at 208, the protocol of the data is a protocol other than UDP, the GOS proceeds to process the data according to the other protocol at 210. For example, if the protocol of the data is TCP, GOS 113 may perform TCP fragmentation or TCP segmentation offload (TSO) according to procedures defined for TCP fragmentation or TSO. Details of TSO may be found in U.S. Pat. No. 10,116,466, which is herein incorporated in its entirety by reference for all purposes.

Returning to operation 208, where the GOS determines the protocol of the data is UDP, the GOS proceeds to check whether the VNIC of the VM supports USO at 212. As shown in FIG. 3A, at 306, GOS 113 determines the UDP protocol and, at 308, GOS 113 checks whether VNIC 117 supports USO. In some embodiments, GOS 113 checks a configuration of a VNIC driver of VNIC 117. In some embodiments, GOS 113 sends a request (e.g., queries) to VNIC 117 for VNIC 117's configuration or a request for whether VNIC 117 supports USO. Accordingly, GOS 113 can determine whether VNIC 117 supports USO based on the configuration or response from VNIC 117. In some embodiments, USO initiator 114 of GOS 113 checks whether VNIC 117 supports USO at 212.

At 214, where the GOS determines, at 212, that the VNIC does not support USO, the GOS proceeds to fragment the UDP data. As shown in FIG. 3A, at 310, where GOS 113 determines, at 308, VNIC 117 does not support USO, GOS 113 fragments the UDP data. As discussed above, the UDP fragments are not independent packets. For example, a first UDP fragment may have a UDP header, while the subsequent UDP fragments do not have a UDP header. Although not shown in the figures, further operations may be performed on the UDP fragments. For example, the UDP fragments are sent to VNIC 117, hypervisor 120, and PNIC 136 for transmission to the destination of the UDP data.

Returning to operation 212, where the GOS determines that the VNIC supports USO, the GOS proceeds to generate a UDP packet with the large UDP data at 216. As shown in FIG. 3A, at 312, where GOS 113 determines, at 308, VNIC 117 supports USO, GOS 113 does not fragment the UDP data, instead, GOS 113 generates the UDP packet with the large UDP data and sends the UDP packet to VNIC 117.

Returning to operation 206, where the GOS determines the data is not larger than the MTU, then GOS proceeds directly to generate the UDP packet at 216. For example, because the data is smaller than the MTU size the data does not need to be divided up (fragmented or segmented), so GOS 113 can generate the UDP packet with the UDP data received from application 115.

Figure 4A:
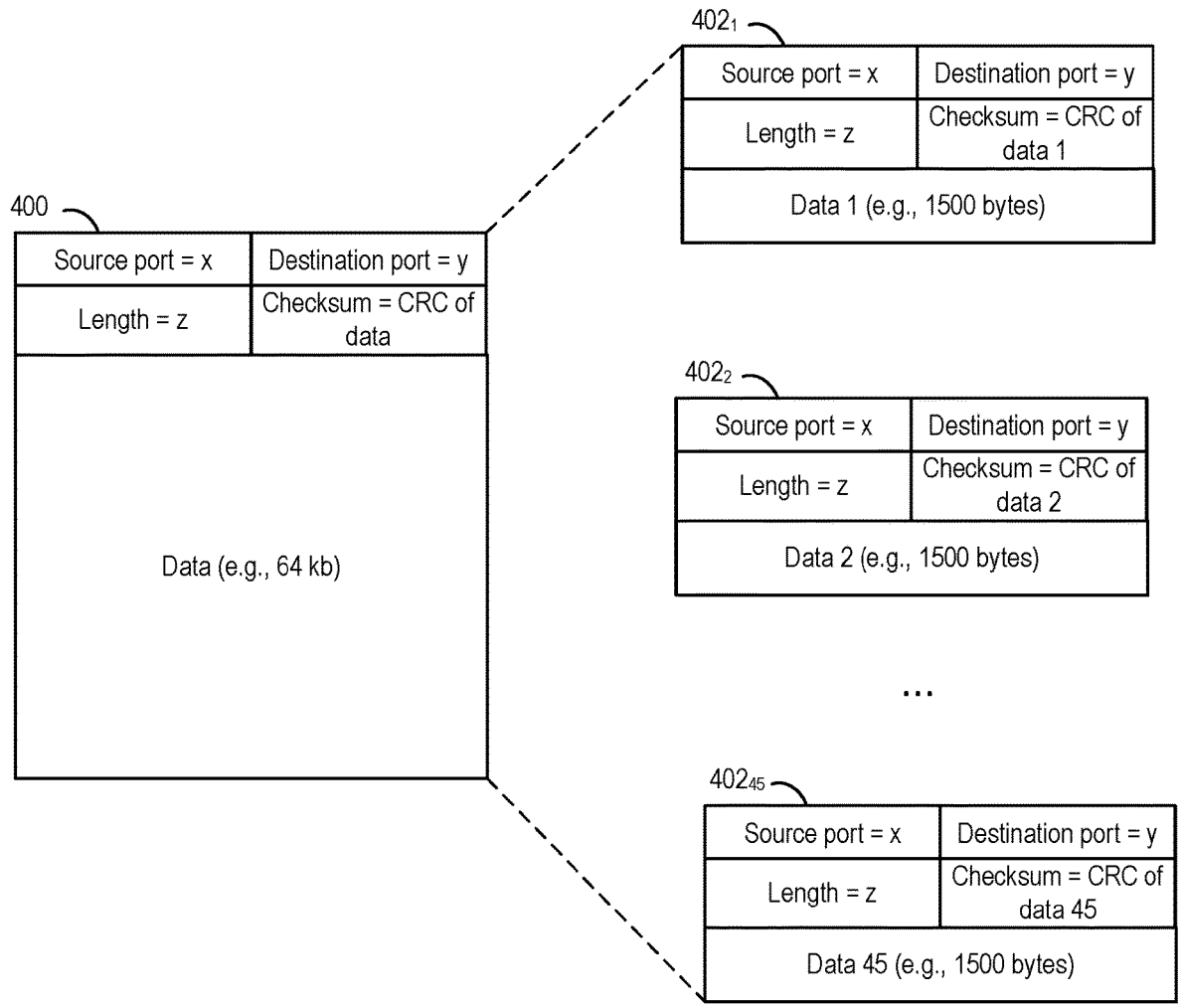
FIGS. 4A-4B each depict a block diagram of an example UDP packet segmented into multiple UDP segments, according to one or more embodiments.

FIG. 4A depicts a block diagram of an example UDP packet 400 that may be generated by GOS 113 at operation 216. As shown, UDP packet 400 may include a source port field, a destination port field, a length field, a checksum field, and payload data. FIG. 4A illustrates segmentation of the UDP packet, which is discussed in more detail below.

Returning to operations 200a in FIG. 2A, at 218, the GOS 113 sends the UDP packet with the large UDP data to VNIC 117.

At 220, the VNIC inserts a USO flag in metadata associated with the UDP packet. As shown in FIG. 3A, at 314, VNIC 117 sets a USO flag in the UDP packet metadata.

Figure 3B:
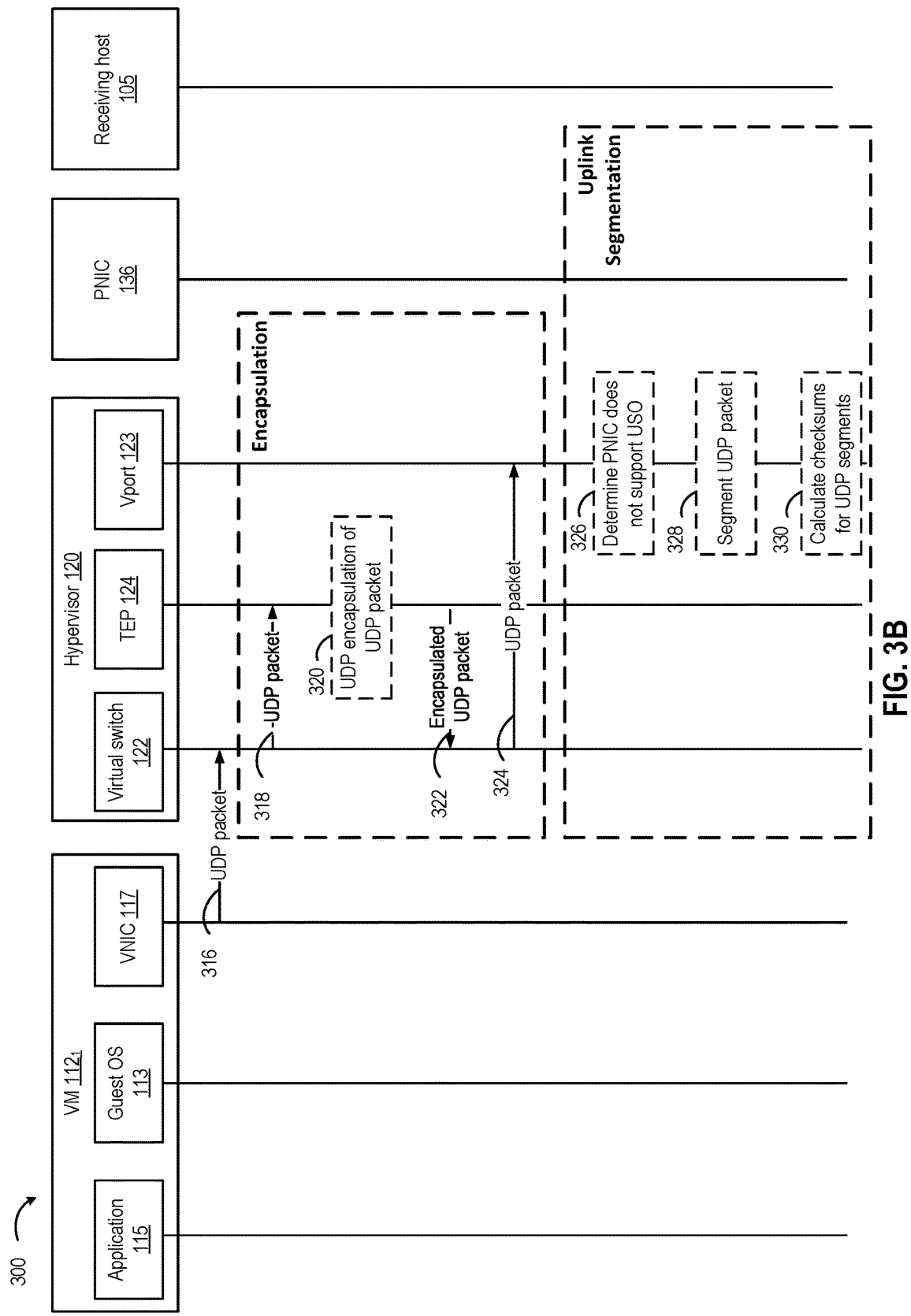

At 222, the VNIC sends the UDP packet to the hypervisor, for example, to the virtual switch on the hypervisor. As shown in FIG. 3B, at 316, VNIC 117 sends the UDP packet to virtual switch 122 (e.g., to vport 121) of hypervisor 120.

At 224, virtual switch 122 checks whether encapsulation is needed for the UDP packet.

At 232, where the virtual switch determines, at 224, that encapsulation is not needed for the UDP packet, the virtual switch proceeds to sends the UDP packet to the uplink layer, for example, to the vport. As shown in FIG. 3B, at 324, where virtual switch 122 determines that encapsulation is not needed for the UDP packet, virtual switch 122 sends the unencapsulated UDP packet to vport 123.

Returning to operation 224, where the virtual switch determines that encapsulation is needed for the UDP packet, the virtual switch proceed to sends the UDP packet to a TEP at 226. As shown in FIG. 3B, at 318, where virtual switch 122 determines that encapsulation is needed for the UDP packet, virtual switch 122 sends the UDP packet to TEP 124. For example, if the UDP packet is to be tunneled via an overlay tunnel, the UDP packet may be encapsulated. In some embodiments, the UDP packet may be encapsulated with a tunnel header (e.g., with a Geneve header or a VXLAN header).

At 228, the TEP encapsulates the UDP packet. As shown in FIG. 3B, at 320, TEP 124 encapsulates the UDP packet.

At 230, the TEP sends the encapsulated packet to the virtual switch and the operations return to operation 232. As shown in FIG. 3B, at 322, TEP 124 sends the encapsulated UDP packet to virtual switch 122.

As shown in operations 200b, after the virtual switch sends the UDP packet to the uplink, the uplink vport checks whether the PNIC supports USO at 234. In some embodiments, vport 123 checks a configuration of a PNIC driver of PNIC 136. In some embodiments, vport 123 sends a request (e.g., queries) to PNIC 136 for PNIC 136's configuration or a request for whether PNIC 136 supports USO. Accordingly, vport 123 can determine whether PNIC 136 supports USO based on the configuration or response from PNIC 136. In some embodiments, USO engine 126 checks whether PNIC 136 supports USO at 234.

At 236, where vport 123 determines, at 234, that PNIC 136 does not support USO, the uplink proceeds to segment the UDP packet. As shown in FIG. 3B, at 326, vport 123 determines PNIC 136 does not support USO and, at 328, segments the UDP packet. In some embodiments, USO engine 126 segments the UDP packet at 236.

At 238, the uplink calculates checksums for each of the UDP segments and adds the checksums to the respective UDP segments. As shown in FIG. 3B, at 328, vport 123 segments the UDP packet in to the respective UDP segments and, at 330, vport 123 calculates the checksum for each of the UDP segments and add the checksums to the respective UDP segments. In some embodiments, USO engine 126 calculates the checksums for each of the UDP segments and adds the checksums to the respective UDP segments at 238.

Figure 3C:
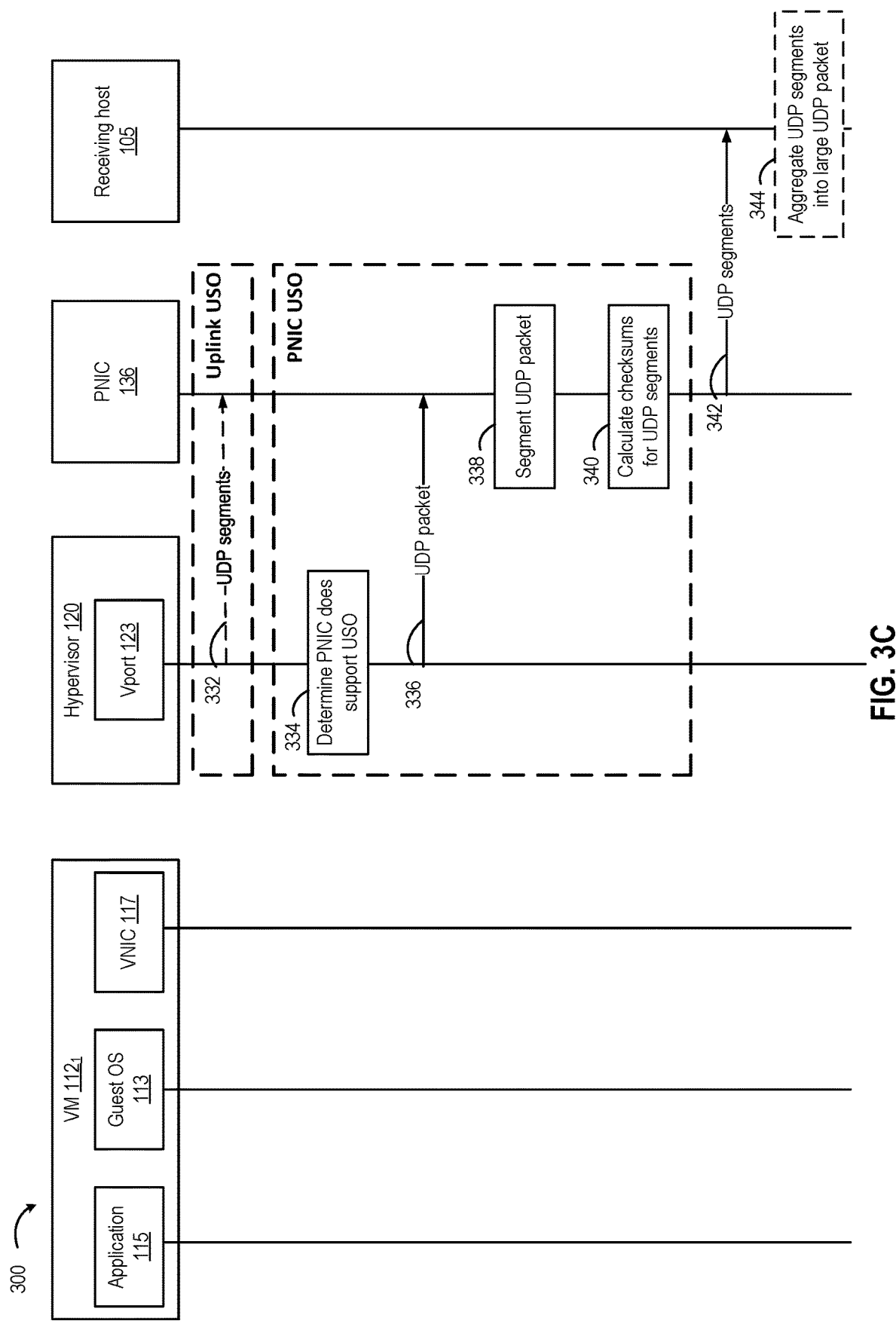

At 240, the vport sends the UDP segments to the PNIC. As shown in FIG. 3C, at 332, vport 123 sends the UPD segments to PNIC 136.

At 248, PNIC 136 sends the UDP segments to the destination. As shown in FIG. 3C, at 342, PNIC 136 sends the UPD segments to a receiving host 105.

Returning to operation 234, where the vport determines the PNIC supports USO, the vport proceeds to send the UDP packet with the large UDP data to the PNIC at 242. As shown in FIG. 3C, at 334, vport 123 determines PNIC 136 supports USO and, at 336, sends the UDP packet to PNIC 136.

At 244, PNIC 136 segments the UDP packet. As shown in FIG. 3C, at 338, PNIC 136 segments the UDP packet. In some embodiments, USO engine 137 of PNIC 136 segments the UDP packet at 244.

At 246, PNIC 136 calculates checksums for each of the UDP segments and adds the checksums to the respective UDP segments and the operations proceed to operation 248. As shown in FIG. 3C, at 340, PNIC 136 calculates checksums for the UDP segments and, at 342, sends the UDP segments to the receiving host 105. In some embodiments, USO engine 137 of PNIC 136 calculates the checksums for each of the UDP segments and adds the checksums to the respective UDP segments at 246.

Referring again to the example UDP packet 400 in FIG. 4A, UDP packet 400 may have a 64 kb data payload. It should be understood, the 64 kb is for the purposes of illustration, a UDP packet may have a different amount of payload data. The data payload of the UDP packet is segmented (e.g., by the uplink or by the PNIC) into forty-five UDP segments, each with a 1500 byte data payload. In some embodiments, the size of each segment is equal to the MTU size. As shown in FIG. 4A, each of the UDP segments $402_1, 402_2, \ldots, 402_{45}$ includes a respective UDP header. The respective UDP header for each of the UDP segments $402_1$-$402_{45}$ includes a respective checksum value for the portion of data carried in that segment.

Where the segmented UDP packet is an encapsulated packet, the large UDP packet is segmented and each of the UDP segments additionally has a tunnel header.

Figure 4B:
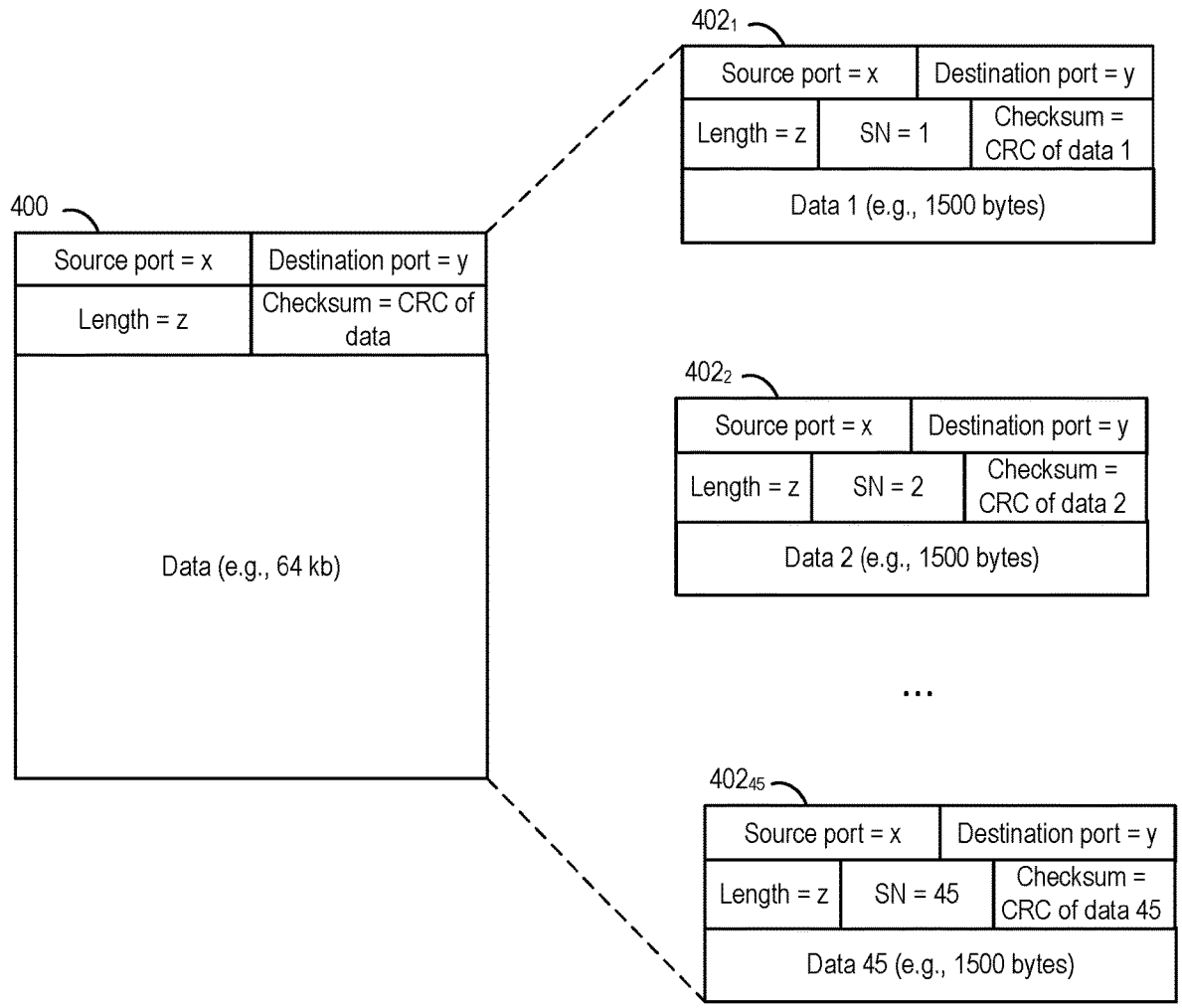

In some embodiments, when the UDP segments are received, the receiver aggregates the UDP segments into a single large UDP packet before forwarding to the destination. As shown in FIG. 3C, at 344, the receiving host 105 aggregates the UDP segments into a large UDP packet. This saves CPU cycles at the destination as the destination only has to process one large packet instead of many smaller packets. In some embodiments, the aggregation is performed by a PNIC or hypervisor of a receiving host before forwarding to a destination VM on the host. In some embodiments, each of the UDP segments includes a segment number (SN) in the header as shown in FIG. 4B. In some embodiments, aggregating the UDP segments into a large UDP packet, at 344, is based on the segments number in the UDP segments. For example, the UDP segments may be ordered according to the order of the segment numbers.

In some embodiments, reliability is not used for UDP and, even if one or more UDP segments are not received at the destination, the UDP data will not be retransmitted. In some embodiments, reliability is used for the UDP.

Figure 3D:
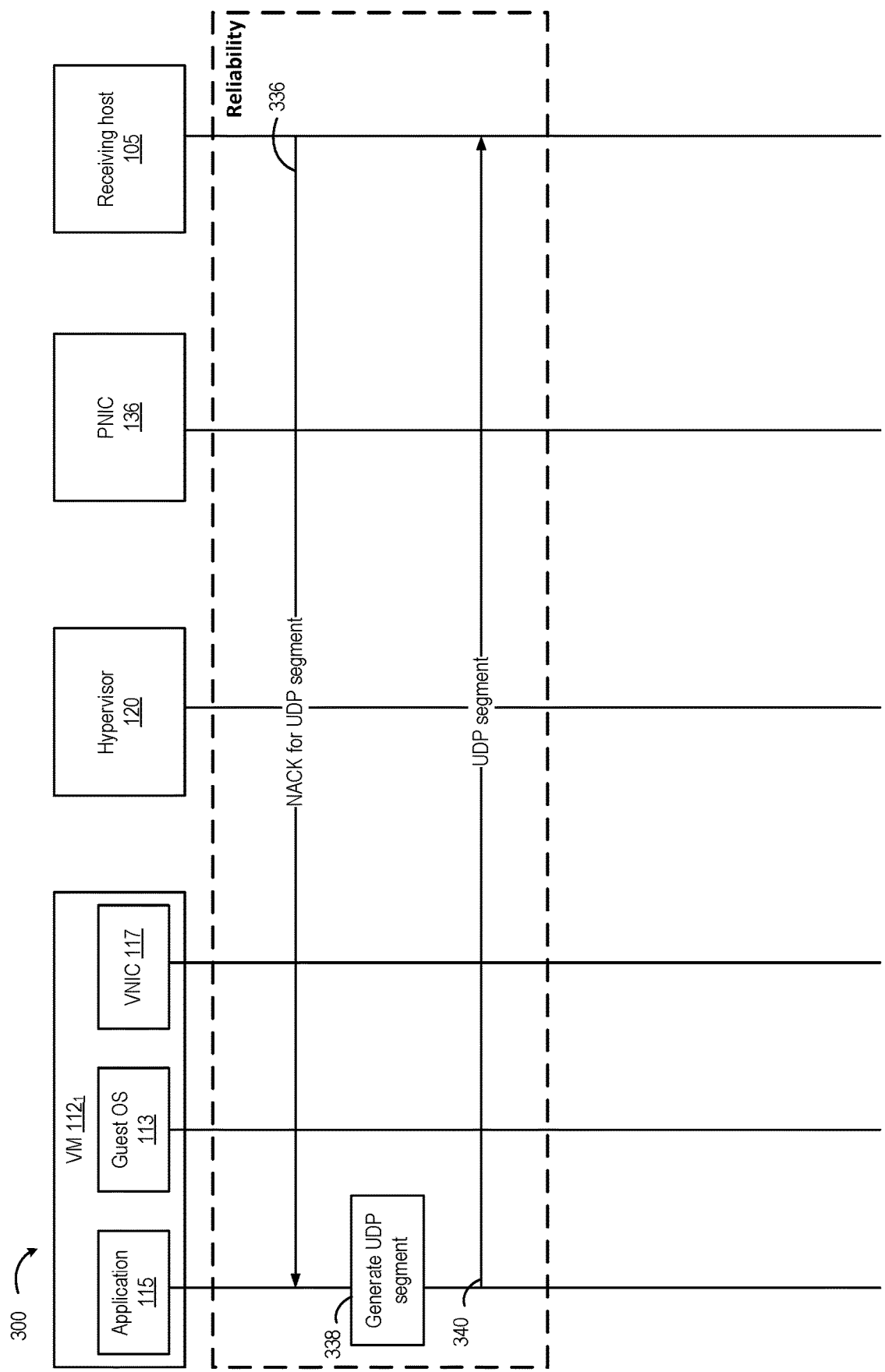

Accordingly, at 250, application 115 may determine whether a NACK was received for one or more UDP segments. If no NACK is received, the operations for the UDP packet may end. If a NACK is received, then at 252 application 115 generates the UDP data associated with the one or more UDP segments indicated by the NACK. As shown in FIG. 3D, at 336, the receiving host 105 may determine that one or more UDP segments were not received and send a NACK for the one or more segments. For simplicity, FIG. 3D shows the NACK sent from receiving host 105 to application 115. It should be understood that intermediate operations occur for the NACK sent from receiving host 105 to arrive at application 115. At 338, application 115 generates the one or more UDP segments indicated by the NACK. At 340, application resends the one or more UDP segments to receiving host 105. As discussed above, with UDP segmentation, application 115 may not resend all of the UDP data associated with the original UDP packet, instead, application only generates and resends the UDP data associated with the one or more UDP segments that were NACK'd. It should be understood that intermediate operations occur for the one or more UDP segments sent from application 115 to arrive at receiving host 105. For example, as shown in FIG. 2B, after generating the UDP data associated with the one or more UDP segments, at 252, the operations may proceed to operation 204.

Various reliability mechanisms may be used for the UDP segments. In some embodiments, QUIC protocol is used. QUIC protocol provides reliability over UDP using a packet identifier (ID) for each transmitted packet which is reported back via an acknowledgment (ACK) or negative ACK (NACK). In some embodiments, a QUIC protocol header may be added to each of the UDP segments, including a unique packet ID for the respective UDP segment. Based on the UDP packet size and the UDP segment size, application 115 can determine the expected number of UDP segments and the packet ID for the respective UDP segments. For example, for UDP packet sizes of 6 kb and a segment size 1500 bytes, where USO is configured, application 115 expects four UDP segments per packet. Thus, application 115 may generate a first packet with packet ID=1, a next packet with packet ID=5, and so on. In some embodiments, when a NACK is received, application 115 retransmits a portion of the packet associated with an indicated packet ID. In some embodiments, when a NACK is received, application 115 retransmits the entire packet associated with the packet ID. In some embodiments, application 115 determines the segment size based on the MTU. In some embodiments, the MTU is based on the link layer, which may be smaller than an MTU the device supports. For example, the MTU may be the default Ethernet link layer data frame size (e.g., 1500 bytes). In some embodiments, application 115 queries GOS 113 for the MTU and GOS 113 provides the MTU to application 115 in response to the query.

In some embodiments, zero copy may be used for the UDP packet. Zero copy refers to passing memory address associated with the UDP packet instead of copying the entire UDP packet. Thus, when the UDP packet is handled by different processes within host 105, instead of copying the UDP packet, only memory addresses of the UDP packet are passed (e.g., from GOS 113 to hypervisor 120) as references in the metadata. Details of zero copy may be found in U.S. Pat. No. 8,667,187, which is herein incorporated in its entirety by reference for all purposes.

Accordingly, the aspects described herein provide a technical solution to a technical problem associated with sending of large UDP data. More specifically USO allows a large UDP packet to be segmented into UDP segments, where the UDP segmentation is offloaded from the VM to the hypervisor or PNIC. Segmenting the UDP data allows for high throughput. Offloading the segmentation, allows for saving CPU cycles at the VM.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that may be useful machine operations. In addition, one or more embodiments of the technology described herein may relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of segmenting a user datagram protocol (UDP) packet, the method comprising:
    generating UDP data by an application running in a virtual computing instance (VCI) running on a host machine;
    sending, by the application, one or more of a segment size and a maximum number of segments to one or more of a virtual network interface card of the VCI, a hypervisor, an uplink virtual port of the hypervisor, or a physical network interface card of the host machine;
    generating the UDP packet, containing the UDP data, at the VCI;
    sending the UDP packet from the VCI to a hypervisor running on the host machine;
    after sending the UDP packet to the hypervisor, segmenting the UDP packet into a plurality of UDP segments, wherein each of the plurality of UDP segments includes a portion of the UDP data and a UDP header, wherein the segmenting is based on the one or more of the segment size and the maximum number of segments; and
    transmitting the plurality of UDP segments, over a network, to a destination of the UDP packet.

2. The method of claim 1, wherein the UDP data contained in the UDP packet is larger than a maximum transmission unit size.

3. The method of claim 1, wherein the segmenting the UDP packet is performed at a physical network interface card of the host machine.

4. The method of claim 1, wherein the segmenting the UDP packet is performed at an uplink virtual port of the host machine.

5. The method of claim 1, further comprising encapsulating the UDP packet at the hypervisor with a tunnel header, wherein each of the plurality of UDP segments includes the tunnel header.

6. The method of claim 1, further comprising:
    receiving a second plurality of UDP segments at the host machine, from another host machine;
    aggregating the plurality of UDP segments into a single UDP packet; and
    sending the single UDP packet to a destination VCI on the other host machine.

7. The method of claim 1, further comprising querying, by a guest operating of the VCI, whether a virtual network interface card (VNIC) of the VCI supports UDP segmentation offload (USO), wherein sending the UDP packet to the hypervisor is based on determining the VNIC support USO.

8. The method of claim 1, further comprising querying, by the hypervisor, whether a physical network interface card (PNIC) of the host machine supports UDP segmentation offload (USO), wherein segmenting the UDP packet comprises:
    segmenting the UDP packet at the hypervisor when the PNIC does not support USO; and
    segmenting the UDP at the PNIC when the PNIC supports USO.

9. The method of claim 1, wherein sending the UDP packet from the VCI to the host machine comprises providing, by the VCI, one or more memory locations of the UDP packet in metadata associated with the UDP packet, wherein the one or more memory locations are in a memory associated with a guest operation system of the VCI.

10. The method of claim 1, further comprising:
    receiving, at the VCI, a negative acknowledgment (NACK) indicating one or more of the plurality of UDP segments were not successfully received at a destination of the UDP packet;
    generating, at the VCI, the one or more of the plurality of UDP segments; and
    resending the one or more of the plurality of UDP segments.

11. The method of claim 1, further comprising:
    receiving the plurality of UDP segments at a second host machine;
    aggregating the plurality of UDP segments into a single UDP packet; and
    sending the single UDP packet to the destination.

12. The method of claim 11, wherein each of the plurality of UDP segments further includes a segment number, and wherein the aggregating is based on the segment numbers in the plurality of UDP segments.

13. A system comprising:
one or more processors; and
at least one memory comprising computer executable instructions, the one or more processors configured to execute the computer executable instructions and cause the system to:
  generate user datagram protocol (UDP) data by an application running in a virtual computing instance (VCI) running on a host machine;
  send, by the application, one or more of a segment size and a maximum number of segments to one or more of a virtual network interface card of the VCI, a hypervisor, an uplink virtual port of the hypervisor, or a physical network interface card of the host machine;
  generate a UDP packet, containing the UDP data, at the VCI;
  send the UDP packet from the VCI to a hypervisor running on the host machine;
  after sending the UDP packet to the hypervisor, segment the UDP packet into a plurality of UDP segments, wherein each of the plurality of UDP segments includes a portion of the UDP data and a UDP header, wherein the segmenting is based on the one or more of the segment size and the maximum number of segments; and
  transmit the plurality of UDP segments, over a network, to a destination of the UDP packet.

14. The system of claim 13, wherein the UDP data contained in the UDP packet is larger than a maximum transmission unit size.

15. The system of claim 13, wherein the one or more processors are configured to cause the system to segment the UDP packet at a physical network interface card of the host machine.

16. The system of claim 13, wherein the one or more processors are configured to cause the system to segment the UDP packet at an uplink virtual port of the host machine.

17. The system of claim 13, the one or more processors are configured to cause the system further to:
  encapsulate the UDP packet at the hypervisor with a tunnel header, wherein each of the plurality of UDP segments includes the tunnel header.

18. A non-transitory computer-readable medium comprising instructions that, when executed by one or more processors of a computing system, cause the computing system to perform operations for segmenting a user datagram protocol (UDP) packet, the operations comprising:
  generating UDP data by an application running in a virtual computing instance (VCI) running on a host machine;
  sending, by the application, one or more of a segment size and a maximum number of segments to one or more of a virtual network interface card of the VCI, ua hypervisor, an uplink virtual port of the hypervisor, or a physical network interface card of the host machine;
  generating the UDP packet, containing the UDP data, at the VCI;
  sending the UDP packet from the VCI to a hypervisor running on the host machine;
  after sending the UDP packet to the hypervisor, segmenting the UDP packet into a plurality of UDP segments, wherein each of the plurality of UDP segments includes a portion of the UDP data and a UDP header, wherein the segmenting is based on the one or more of the segment size and the maximum number of segments; and
  transmitting the plurality of UDP segments, over a network, to a destination of the UDP packet.

* * * * *